(12) United States Patent
Vancura et al.

(10) Patent No.: US 7,360,764 B2
(45) Date of Patent: Apr. 22, 2008

(54) APPORTIONMENT OF PAY OUT OF CASINO GAME WITH ESCROW

(75) Inventors: Olaf Vancura, Las Vegas, NV (US); Terrance William Oliver, Reno, NV (US)

(73) Assignee: Progressive Gaming International Corporation, Las Vegas, NV (US)

( * ) Notice: Subject to any disclaimer, the term of this patent is extended or adjusted under 35 U.S.C. 154(b) by 589 days.

(21) Appl. No.: 10/775,504

(22) Filed: Feb. 10, 2004

(65) Prior Publication Data

US 2004/0160009 A1 Aug. 19, 2004

Related U.S. Application Data

(63) Continuation of application No. 10/410,002, filed on Apr. 9, 2003, now Pat. No. 6,692,005, which is a continuation of application No. 10/199,224, filed on Jul. 19, 2002, now Pat. No. 6,554,283, which is a continuation of application No. 09/952,721, filed on Sep. 13, 2001, now Pat. No. 6,435,511, which is a continuation of application No. 09/393,000, filed on Sep. 9, 1999, now Pat. No. 6,390,473.

(51) Int. Cl.
*A63F 1/00* (2006.01)
(52) U.S. Cl. ...................................... 273/292
(58) Field of Classification Search ................ None
See application file for complete search history.

(56) References Cited

U.S. PATENT DOCUMENTS

| 4,582,324 A | 4/1986 | Koza et al. |
| 4,604,065 A | 8/1986 | Frazer et al. |

(Continued)

FOREIGN PATENT DOCUMENTS

GB 2 197 974 A 6/1988

OTHER PUBLICATIONS

See Attached=p. 2-2.
Bally Monte Carlo Slot Machine #1: Document with original color JPEG image of game tag of 1977 Bally Monte Carlo slot machine #1 (40% scaled).

(Continued)

*Primary Examiner*—Eugene Kim
*Assistant Examiner*—Dolores R. Collins
(74) *Attorney, Agent, or Firm*—Dorr, Carson & Birney, P.C.

(57) ABSTRACT

A method of a house apportionment of a bonus value is used to pay during play of a bonus game. Entry of the bonus game is achieved during play of an underlying game of chance. The method of house apportionment includes steps of awarding the player a portion of the bonus value for the bonus game and adding the remainder of the bonus value to at least one escrow account available to reward the player or subsequent players. The awarding step is based on bonus games including the step of knowledge-based playing. The awarding step of the knowledge-based bonus game includes the step of knowledge-based playing by answering, selecting or guessing the appropriate responses to questions. The step of knowledge-based playing includes the step of selecting or guessing the appropriate answers to multiple choice questions. The step of knowledge-based playing by answering, selecting or guessing includes the step of challenging the player with questions having a common theme. The knowledge-based playing step of the bonus game includes the step of asking the player questions the bonus value of which is measured against survey responses. The knowledge-based playing by the step of answering; selecting or guessing includes the step of asking questions of varying difficulty. An alternate step adds the remainder of the bonus value to at least one escrow account available to reward the player or subsequent players such that the average bonus value paid by the house remains constant and the house advantage is fixed regardless of player proficiency in the bonus game. The amount of the awarding is based on time taken or clues received during the game.

15 Claims, 3 Drawing Sheets

U.S. PATENT DOCUMENTS

| | | | |
|---|---|---|---|
| 4,861,041 A | 8/1989 | Jones et al. | |
| 5,393,057 A | 2/1995 | Marnell, II | |
| 5,415,414 A | 5/1995 | Savage | |
| 5,417,430 A | 5/1995 | Breeding | |
| 5,423,551 A | 6/1995 | Stavinsky | |
| 5,472,194 A | 12/1995 | Breeding et al. | |
| 5,544,892 A | 8/1996 | Breeding | |
| 5,584,485 A | 12/1996 | Jones et al. | |
| 5,626,341 A | 5/1997 | Jones et al. | |
| 5,718,429 A * | 2/1998 | Keller, Jr. | 273/274 |
| 5,794,964 A | 8/1998 | Jones et al. | |
| 5,795,225 A * | 8/1998 | Jones et al. | 463/13 |
| 5,913,726 A | 6/1999 | Jones et al. | |
| 6,019,374 A | 2/2000 | Breeding | |
| 6,070,874 A * | 6/2000 | Ivers | 273/292 |
| 6,073,930 A | 6/2000 | Jones et al. | |
| 6,189,888 B1 | 2/2001 | Brunelle | |
| 6,217,024 B1 | 4/2001 | Lofink | |
| 6,334,614 B1 | 1/2002 | Breeding | |
| 6,345,824 B1 | 2/2002 | Selitzky | |
| 6,390,473 B1 * | 5/2002 | Vancura et al. | 273/292 |
| 6,435,511 B1 * | 8/2002 | Vancura et al. | 273/292 |
| 6,446,972 B1 | 9/2002 | Brunelle | |
| 6,554,283 B2 * | 4/2003 | Vancura et al. | 273/292 |
| 6,692,005 B2 * | 2/2004 | Vancura et al. | 273/292 |

OTHER PUBLICATIONS

Bally Monte Carlo Slot Machine #1: Document with original color JPEG image of game tag of 1977 Bally Monte Carlo slot machine #1 (49% scaled).

Bally Monte Carlo Machine #2: Report entitled "Bally Manufacturing Corporation Monte Carlo Slot Machine Product Analysis Report," dated Jan. 28, 2004, pp. 1-36, with original color images, prepared by TAEUS describing 1976 Bally Monte Carlo slot machine #2.

Bally Monte Carlo: Oct. 18, 2001 letter from Robert Kovelman to Joseph Walkowski.

Bally Monte Carlo: Document with photocopies image of upper portion of 1977 Bally Monte Carlo slot machine #1 enclosed with Oct. 18, 2001 letter.

Bally Monte Carlo: Document with photocopied image of entire 1977 Bally Monte Carlo slot machine #1 enclosed with Oct. 18, 2001 letter.

Bally Monte Carlo: 1-page sheet enclosed with Oct. 18, 2001 letter showing and describing 1977 Bally Monte Carlo game.

Bally Monte Carlo: 1-page advertisement enclosed with Oct. 18, 2001 letter showing Bally Monte Carlo game, dated 1978.

Bally Monte Carlo: 1-page document enclosed with Oct. 18, 2001 letter listing model numbers, names and release dates for various Bally games, including Model Nos. 1117 for Danish Monte Carlo releases Jan. 5, 1977 and Model No. 1117-1 for Australian Monte Carlo released Jan. 18, 1977.

Bally Monte Carlo: 1-page document enclosed with Oct. 18, 2001 letter showing image of three 2001 Bally Monte Carlo slot machines.

Bally Monte Carlo Slot Machine #1: Oct. 19, 2001 email from Robert Kovelman to Joseph Walkowski.

Bally Monte Carlo Slot Machine #1: Document with original color image of upper portion of 1977 Bally Monte Carlo slot machine #1 enclosed with Oct. 19, 2001 email.

Bally Monte Carlo Slot Machine #1: Document with original color image of entire 1977 Bally Monte Carlo slot machine #1 enclosed with Oct. 19, 2001 email.

Bally Monte Carlo Slot Machine #1: Oct. 23, 2001 email from Robert Kovelman to Joseph Walkowski regarding 1977 Bally Monte Carlo Slot machine #1, 2 pages.

* cited by examiner

A METHOD OF HOUSE APPORTIONMENT DURING PLAY OF A BONUS GAME

AWARDING THE WINNER A PORTION OF THE BONUS FOR THE BONUS GAME

ADDING THE REMAINDER OF THE BONUS VALUE TO A PROGRESSIVE TO REWARD A PLAYER

A METHOD OF HOUSE APPORTIONMENT OF A VALUE TO BE PAID BY THE HOUSE DURING A PLAY OF A KNOWLEDGE BASED GAME

AWARDING THE PLAYER A PORTION OF THE VALUE

ADDING THE REMAINDER OF THE VALUE TO AT LEAST ONE PROGRESSIVE ACCOUNT AVAILABLE TO REWARD THE PLAYER OR SUBSEQUENT PLAYERS

APPORTIONMENT OF PAY OUT OF CASINO GAME WITH ESCROW

RELATED APPLICATIONS

This application is a continuation of U.S. patent application Ser. No. 10/410,002 filed Apr. 9, 2003, now U.S. Pat. No. 6,692,005 issued on Feb. 17, 2004, which is a continuation of U.S. patent application Ser. No. 10/199,224 filed Jul. 19, 2002, now U.S. Pat. No. 6,554,283 issued on Apr. 29, 2003, which is a continuation of U.S. patent application Ser. No. 09/952,721 filed Sep. 13, 2001, now U.S. Pat. No. 6,435,511 issued on Aug. 20, 2002, which is a continuation of U.S. patent application Ser. No. 09/393,000 filed Sep. 9, 1999, now U.S. Pat. No. 6,390,473 issued on May 21, 2002.

BACKGROUND OF THE INVENTION

1. Field of the Invention

The present invention relates to casino games and, in particular, to casino games utilizing a player's knowledge as part of the game play wherein the house advantage is secured against a player with perfect knowledge.

U.S. Pat. No. 5,718,429 discloses a method of combining a casino game with a game of skill wherein a win in the casino game allows entry to a game of skill with an award of cash. The method separates the gambling aspect from the cash or prize that is only awarded for skill.

U.S. Pat. No. 5,393,057 discloses a primary gaming device preferably poker but other primary gaming devices can be used, e.g. a reel-type slot machine gaming apparatus coupled to a bingo gaming apparatus. Alternatively, the primary gaming device could be a dice game or a trivia quiz game.

U.S. Pat. No. 4,582,324 discloses a video lottery game wherein player input provides the illusion of skilled play while random machine operation determines the winning of a prize award.

U.S. Pat. No. 4,604,065 describes a detector pen that discriminates between areas on a printed substrate such as paper by detecting magnetic energy, infrared energy, or electrical energy of different parts of a printed surface. The detector pen may be used on games such as quiz games in order to identify the selection of a correct answer.

2. Statement of the Problem

Many casino games incorporate an element of skill, either in betting or playing. For example, several Craps wagers have a house advantage of about 1%, whereas others have a house edge in excess of 10%. It is clear that the player will last longer, over time, by choosing wagers wisely. Similarly, in blackjack, a skillful participant who plays well strategically will fare better than a more haphazard player who chooses to hit and stand with little regard for the prevailing conditions.

Although casino games utilizing skill are popular, a "skillful" player will not necessarily realize short-run success. Consider blackjack for example, in which the correct play is often met with results counter to that desired. With a hand of player 15 verses dealer's 8, the proper play is to hit, but should the player receive a ten, the player will have busted (lost) despite the correct strategic play. Conversely, incorrect plays may often be rewarded. For the same hand, if the player stands, this is a poor decision. Yet, should the dealer turn over a 7 (for a total of 15) and hit with a ten, the house will have busted. The player will have won despite the incorrect strategic play.

Understandably, casinos would resist any game wherein a skilled or knowledgeable player could defeat the house advantage. The public has shown a fascination with the testing of a player's knowledge of trivia, facts, surveys, pricing, and so forth. A need exists to incorporate this popular pastime into casino gaming.

The risk is that a knowledgeable player will be able to turn the tables and realize an advantage over the house. Essentially, a knowledge-based game constructed in the classical sense is prone to those "in the know." For example, consider a game in which the player wagers 5 coins and is presented with a true/false question. Should the player answer correctly, the reward is 9 coins (a win of 4 coins); should the player answer incorrectly, there is no reward (a loss of 5 coins). Statistically in this game, a player with no knowledge could guess correctly about half the time, leading to a house advantage of 10%. However, a player with perfect knowledge will (by definition) get every answer right and will have a surprising 80% advantage over the house; this is clearly unacceptable to the viability of the game in a casino environment.

A provisional entitled, Knowledge Based Casino Game and Method Therefor, U.S. Ser. No. 06/099,959, filed Sep. 11, 1998 disclosed a method for incorporating knowledge into casino games. Therein, the method taught used a knowledge-based approach to provide new casino games, and kept the associated expected return (from the knowledge-based portion) sufficiently small so that even a player with perfect knowledge would not be able to gain an advantage (or alternatively, only a minimal win). That application disclosed an algorithm for analyzing the two types of players that represent the extremes of a range: a player with perfect knowledge and a player with no knowledge. All, actual players, would fall somewhere at or between those boundaries. Thus, if the mathematical analysis of the game considers those extremes, the "average" house advantage would fall somewhere in the middle of the range.

It would be an advantage and commercially viable to develop a knowledge-based casino game in which the house advantage is fixed, or narrowly limited, hence not subject to a range of possibilities depending on a player's knowledge.

It would be a further advantage to have an escrow, or progressive, feature associated with the knowledge-based casino game. The escrow award could grow and be awarded to the player who ultimately correctly answers one or more knowledge-based questions.

3. Solution to the Problem

The solution as presented herein comprises a knowledge-based game with an escrow. The escrow or progressive value is seeded and incremented in such a fashion that the overall house advantage may be constant regardless of a player's knowledge, whether perfect, zero, or anything in between.

It is an advantage that the knowledge-based casino game disclosed herein has a fixed or narrowly limited house advantage, hence is not subject to a range of possibilities depending on a player's knowledge.

It is a further advantage that the knowledge-based casino game disclosed herein has an escrow or progressive feature associated with it.

DETAILED DESCRIPTION

Figure 1:
FIG. 1 is a flow diagram of a method of house apportionment disclosed for a knowledge-based bonus game.
Figure 1:

As skill may be interpreted as a form of knowledge, the following definitions are used:

"Skill" refers to a decision (in betting, playing, or both) such that long term performance is maximized. On an individual-trial basis, however, adopting "skillful" play may or may not yield a desired result, as an element of randomness remains. As an example consider, the discussion of playing a hand of blackjack already described.

"Knowledge" refers to a decision that, on an individual-trial basis, yields necessarily a desired result. An example is the decision of how to respond to the question, "Which United States state is the geographically smallest?" Clearly, a correct answer has no associated uncertainty.

The approach applied herein is especially suitable for games wherein the player has a high level of knowledge or skill. As will be explained, the concept includes apportionment of the pay out, or value, of the bonus, jackpot, progressive or otherwise including the underlying game via a remainder funded escrow or some variant thereof. That is to say that, the preferred embodiment is a bonus game with apportionment to fix the house advantage, or essentially so, but any game including the underlying game can have an apportioned pay out to protect against skillful or knowledgeable play.

Consider a bonus game testing players knowledge. The knowledge-based bonus game could be atop an underlying conventional slot machine. The slot machine can be a standard stepper-reel or video-reel which includes a bonus feature. The overall game is the underlying game of chance plus the bonus game. The knowledge-based bonus game could be achieved upon reaching a win or other random event during primary play of the underlying slot machine.

Without loss of generality, assume that with X units wagered, the player is eligible for the knowledge-based bonus game with frequency f. The expected return is R units for the game without the bonus, and during the bonus participation, on average, garners a bonus value of B units. The formula for calculating the house advantage may be written as:

$$\text{House Advantage} = -[R + f B - X]/X \quad \text{Formula 1}$$

For example, consider a slot machine in which the player (with max bet, X, of 3 coins-in) is eligible for a knowledge-based bonus game with frequency of 0.01 (1 in every 100 spins). Furthermore, the expected return R, on the conventional underlying game of chance without the bonus, is 2 units or (66.7%). Assume a desired house advantage of 8%. Solving Formula 1, the desired B=76 units.

It is important to note that the value of B represents an average award of 76 units. Each individual visit to the bonus round may award the player with more, or less, than 76 units so long as on average, 76 units are paid.

To allow play by a player with perfect knowledge while maintaining a house advantage, one form of this invention occurs as the machine distributes B. For example, when an incorrect answer to a knowledge-based game is given, the player receives just a portion of B, the remainder of B being deposited to a player's escrow account. At such time as any player triggers the escrow (in a manner to be described), the current value of the players's escrow account is awarded. For example, in one embodiment, a correct answer triggers the escrow; the correctly answering player receives B plus the current value of the escrow. As used herein players's escrow is an accumulating, or progressive, fund available for future players.

In this example, although an individual player may or may not receive the entire value of B, a portion of B has been awarded upon each visit to the bonus round; the remainder of which has been "awarded" to escrow. From the casino or house operator's point of view, a constant house advantage is thus ensured.

The casino, house or operator, in fact, does not care if the current or a future player (via escrow) receives the escrowed portion of B. What is important to the casino, house or operator is that all of B has been paid (either immediately or to escrow), and in this sense is no longer on the machine's "books." More importantly, the player with perfect knowledge can, at best, instantaneously win just the awarded portion of B, since the escrow represents prior "awards" from the operator's point of view.

For example, consider a game with the parameters as described already, and with a knowledge-based bonus game that functions in the following manner. A touch screen is employed and the player is presented with a question and three possible answers. If the player answers correctly, 76 units plus the current value of the escrow are awarded. If the player answers or guesses incorrectly, a portion, 50 units, is awarded and the remainder, 26 units, is added to escrow. In this way, the value B for the knowledge-based bonus game is preset at 76 units, whether or not the player answered the question correctly. Thus, a method has been disclosed for maintaining the house advantage constant, regardless of the player's knowledge level. The game has the appealing feature that should a player fail to answer correctly, the escrow value grows, prompting the player to continue in an effort to revisit the bonus and "unlock" the accumulated award.

Note that the player need not be prompted with possible responses. A keyboard or voice recognition mechanism can be employed to input answers. For example, the query "What is the present population of Las Vegas?" might be given. The closer a player guessed at the correct answer, the greater the fraction of B that would be awarded. Any remaining units would be credited to the escrow meter. Furthermore, stipulations such as "player cannot be higher than the answer" or "player cannot be lower than the answer" can be put in place as an added twist to the game.

Also, a series of questions could be utilized to challenge individuals with superior knowledge. Thus, a player answering correctly may be rewarded and queried with another question, and so forth, until missing a question. Alternatively, a quiz comprising, e.g. seven questions might be given and the player rewarded a portion of B based on the percent of correct answers of the total answers. The remainder of B would be credited to the escrow meter. Should a player answer all seven questions correctly, the player would win the collected escrow award in addition to the value of B.

In addition, a time limit may be placed on the player. This time limit may be such that after time expires, the player is awarded as if he had answered incorrectly. Alternatively, a timer may be employed such that a player who answers correctly quickly is awarded a larger prize than a player who answers correctly albeit more slowly. Too, a timer may be employed such that any quick answer (whether correct or incorrect) receives a larger award than the corresponding (correct or incorrect) slow answer. The awarding step includes the step of basing the amount of the award on the length of time taken to complete the knowledge-based game. The awarding step includes the step of yielding generally higher awards for a shorter length of time, and lesser awards for a longer length of time.

Also, clues may be given to help the player determine the correct answer. These clues may be given as a function of time (e.g., every 5 seconds, another clue is revealed). Alternatively, the clues may be "bought" by the player, either literally or in the form of reduced awards. For example, consider the query "Which state in the United States has the largest area?" Assume a bonus value B of 50 coins. Should the player want to buy a hint, it may cost an additional wager of 10 coins. Hence, the puzzled player may literally buy a hint for 10 coins. Hints such as "The state begins with the letter 'A'" or "The state is not part of the continental U.S." may be given to help the player determine the correct answer, albeit at a lesser net than if the player had correctly determined the answer without buying any hints. The awarding step includes the step of yielding generally higher awards for a lesser number of clues, and yielding generally lesser awards for a greater number of clues. The step of awarding further includes the step of a player buying a clue.

Questions may also be utilized which may have several correct answers (e.g., survey questions), or may have answers that can be scaled to responses (e.g., how "close" the player guessed at the actual answer). Furthermore, puzzles, etc. can also be provided in which logic and/or knowledge results in a known method of solution with no uncertainty.

Whether used as a bonus or as a part of a game, the means of initiating the bonus or entering the part of the game is immaterial to this invention. What is material is that during a bonus game, as explained, the algorithm described (or something similar) is used to ensure either a constant house advantage or essentially so. The exact nature of the bonus game could be one of many possibilities, some of which have been described.

It is important to note that while the teachings of this invention are suitable for knowledge-based gaming, the invention can be applied to non-knowledge-based gaming as well. For example, the player may, upon visiting a bonus game of value B, roll two dice. If the total is 12, the player wins the value of B plus the escrow award. If the player rolls 7 through 11 inclusive, he wins ¾ of B, the remainder going to escrow. If the player rolls less than 7, he wins ½ of B, the remainder going to escrow. In this fashion, the current invention can be applied to a game with no skill or knowledge. In this case, the advantage is that a player who did not unlock the escrow is encouraged to continue to play. Similarly, the game may be applied to a game of skill, but not knowledge.

We note that the house advantage is constant when the escrow begins anew at zero immediately after being won. However, the house may wish to "re-seed" the escrow at a non-zero value to encourage additional play immediately after an escrow amount has been won. Below we discuss two methods by which a non-zero reset may be accomplished.

A first method of accomplishing a non-zero reset is for the house simply to provide that reset value for a new escrow after an escrow is won. In so doing, the house foregoes a constant house advantage, since the actual house advantage will be a function of how often the escrow is won. However, the house will encourage additional play since the escrow never resets to zero.

A second, preferred, method is for the house to further set aside a portion of each escrow contribution to a reserve. In this case, the players' escrow account is further divided into a current escrow and a reserve escrow. Each contribution is apportioned to either the current or reserve escrow. When the current escrow fund is won, the value of the reserve escrow becomes the new reset value of the current escrow. The advantage herein is that additional play is encouraged, even immediately after an escrow has been won, while maintaining a constant house advantage. The method may have the step of adding to the at least one escrow account includes the steps of dividing into a current escrow account and a reserve escrow account. The method could also have the step of dividing includes putting a bigger share into the current escrow account and a smaller share into the reserve escrow account.

For example, consider a bonus game of average value B equal to 100. A player not winning the bonus round is awarded an average of 40, the remaining 60 being distributed in the following manner: 40 to the current escrow, and 20 to the reserve escrow. As before, a player winning the bonus round is awarded 100 plus the current escrow. If, on average, it requires 5 visits (4 unsuccessful plus 1 successful) to the bonus round to unlock the current escrow, then the average reset value will be 80 coins, and the average value of the current escrow, when successfully won, will be 240 coins.

Note that while this example contributes to the reserve escrow only when a player is unsuccessful in winning the current escrow, this need not be the case. Indeed, a contribution to the reserve escrow may be made upon each visit to the bonus round, or based upon some other criteria, such as randomly, upon every successful visit to the bonus round, upon every other visit to the bonus round, and so forth. Too, the portion contributed to the reserve escrow need not be fixed. To summarize, the exact nature by which the reserve escrow is funded is not material to this invention. What is material is that there is a reserve escrow suitable for re-seeding the current escrow after being won.

While the foregoing has been discussed in terms of a bonus game, the teachings herein are equally applicable to a standalone configuration. Consider a game in which X=10 units must be wagered. The award for the game is randomly selected from the following weighted pay table:

| Probability | Potential Award |
|---|---|
| 0.1 | 5 |
| 0.2 | 8 |
| 0.6 | 10 |
| 0.1 | 15 |

The average potential award is thus 0.1×5+0.2×8+0.6×10+0.1×15=9.6 units=B. A player is given a question and two possible responses. Should the player answer correctly, he is awarded the potential award plus any escrow. Should the player answer incorrectly, he is awarded nothing, the potential award being added to escrow.

It is clear, based on the discussion above, that the house, in effect, is paying an amount equal to B on every play. If the player is correct, the house is paying the player directly (plus any escrow). If the player is incorrect, the house is paying the player indirectly through escrow. Hence, the house advantage for this game (using formula 1 with R=0 and f=1) is simply:

$$(X-B)/X = 4\%$$

It should be clear that the teaching above of current and reserve escrows is equally applicable in the case of a standalone game. Note that the foregoing example is illustrative only and not meant to limit the teachings of the invention. The use of questions and answers is also illustrative, and any suitable game could be employed.

The following represents an illustrative example under the teachings of the present invention of implementing a knowledge-based game as bonus game atop underlying games of chance. Although a preferred embodiment, this in no way should be interpreted to limit the scope of the invention. Instead, it is meant to indicate possibilities under the teachings of this invention.

EXAMPLE

FAMILY FEUD Game Show

Consider a slot machine with a knowledge-based bonus game in which, periodically, the player gets to participate in FAMILY FEUD. As in the game show, a question given to 100 people will be presented to the player. Seven possible answers will be shown to the player, comprising in random order the top five actual answers and two bogus answers.

The object of the game is for the player to choose the five correct answers while avoiding the two incorrect answers. Upon beginning, and during each subsequent turn after a correct guess, the player selects an answer believed to be one of a top five or most popular actual answer. If chosen correctly, then the number of people (between 1 and 100) that gave the player's response is credited or awarded to the player, and another guess is allowed. If guessed incorrectly, then the knowledge-based bonus game ends, with any unclaimed credits (i.e., the sum of the actual answers not chosen) deposited to the progressive or escrow account.

E.g., the query "Name something everyone complains about" might be accompanied by these responses:

| | | |
|---|---|---|
| A) Politicians | (26) | |
| B) Taxes | (35) | |
| C) Spouse | (Bogus) | |
| D) Lawyers | (11) | |
| E) Work | (21) | |
| F) Health | (Bogus) | |
| G) Traffic | (7) | |

The actual survey results of 100 people show in parentheses. For the example given, they total 100 but could be slightly less. The actual survey results would be invisible to the player as the answers are sought. For exemplary purposes, assume the escrow progressive is presently at 300 coins.

If the player selects (D), he is awarded 11 coins and another guess. The choice (D) is no longer displayed, or otherwise denoted as already having been guessed. Thereafter, if the player selects (B), he is awarded 35 more coins and another guess. Again, choice (B) is no longer displayed. Thereafter, if the player picks (C), the knowledge-based bonus game is over since this is a bogus answer. The player receives a total of 35+11=46 coins. The remaining 26+21+7=54 coins are added to the escrow, for a new progressive total of 354 coins.

Upon a player (the same one or another at that machine) again entering the bonus round, the escrow would show the new total of 354 coins. The game continues this way until a player correctly guesses the five actual answers while avoiding the two bogus answers. Doing so awards the player not only the values for the actual answers, but also the current value of the escrow. Thereafter, the escrow resets to zero coins, or if desired, some other initial value that is a design choice. Alternately, under the teachings herein as described above, a reserve escrow may also be employed so as to reseed an escrow after being won.

The example above is illustrative only and not meant to limit the teachings of this invention.

A method of a house apportionment of a bonus value is used to pay during play of a bonus game. FIG. 1 shows a flow diagram for the house apportionment of the bonus game bonus value. Entry of the bonus game is achieved during play of an underlying game of chance. The method of house apportionment includes steps of awarding the player a portion of the bonus value and adding the remainder of the bonus value to at least one escrow account available to reward the player or subsequent players. The awarding step is based on the bonus game including the step of knowledge-based playing. The awarding step of the knowledge-based bonus game includes the step of knowledge-based playing by answering, selecting or guessing the appropriate responses to queries. The step of knowledge-based playing includes the step of selecting or guessing the appropriate answers to multiple choice questions. The step of knowledge-based playing by answering, selecting or guessing includes the step of challenging the player with questions having a common theme. The knowledge-based playing step of the bonus game includes the step of asking the player questions the value of which is measured against survey responses. The knowledge-based playing by the step of answering, selecting or guessing includes the step of asking questions of varying difficulty.

The step of awarding includes the step of first achieving a predetermined yet random event in the underlying game of chance to begin play of the bonus game. The expected value of the bonus game is fixed regardless of player proficiency in the bonus game. The awarding step of the bonus game happens with the wagering of X units to be eligible for the bonus game with a frequency f and with the expected return R units for an underlying game without the bonus, and with bonus participation, on average, garnering the expected bonus value of B units and wherein the step of calculating the house advantage as equal to $-[R + fB - X]/X$.

The step of adding to the at least one escrow account includes the steps of dividing into a current escrow account and a reserve escrow account. The step of dividing includes putting a bigger share into the current escrow account and a smaller share into the reserve escrow account.

The method of house apportionment including the steps of awarding the player a portion of the bonus value and adding the remainder of the bonus value to at least one escrow account available to reward the player or subsequent players. The step of predetermining the bonus value paid by the house follows. The step of awarding the bonus value is with a step of selecting the bonus value randomly. The awarding step includes fixing the expected bonus value of the bonus game regardless of player proficiency in the bonus game.

The method of house apportionment includes the steps of, awarding the player a portion of the bonus value and adding the remainder of the bonus value to at least one escrow account available to reward the player or subsequent players. The average bonus value paid by the house remains constant. Thus the house advantage is fixed regardless of player proficiency in the bonus game. The steps of awarding and adding will be steps that over time provide a constant house advantage. The steps of awarding and adding are performed in connection with the step of playing a knowledge-based bonus game. The step of predetermining the bonus value paid by the house is followed. The step of determining randomly the bonus value paid by the house is practiced. The step of determining the bonus value paid by the house is predetermined. The step of determines randomly the bonus value paid by the house.

Figure 2:
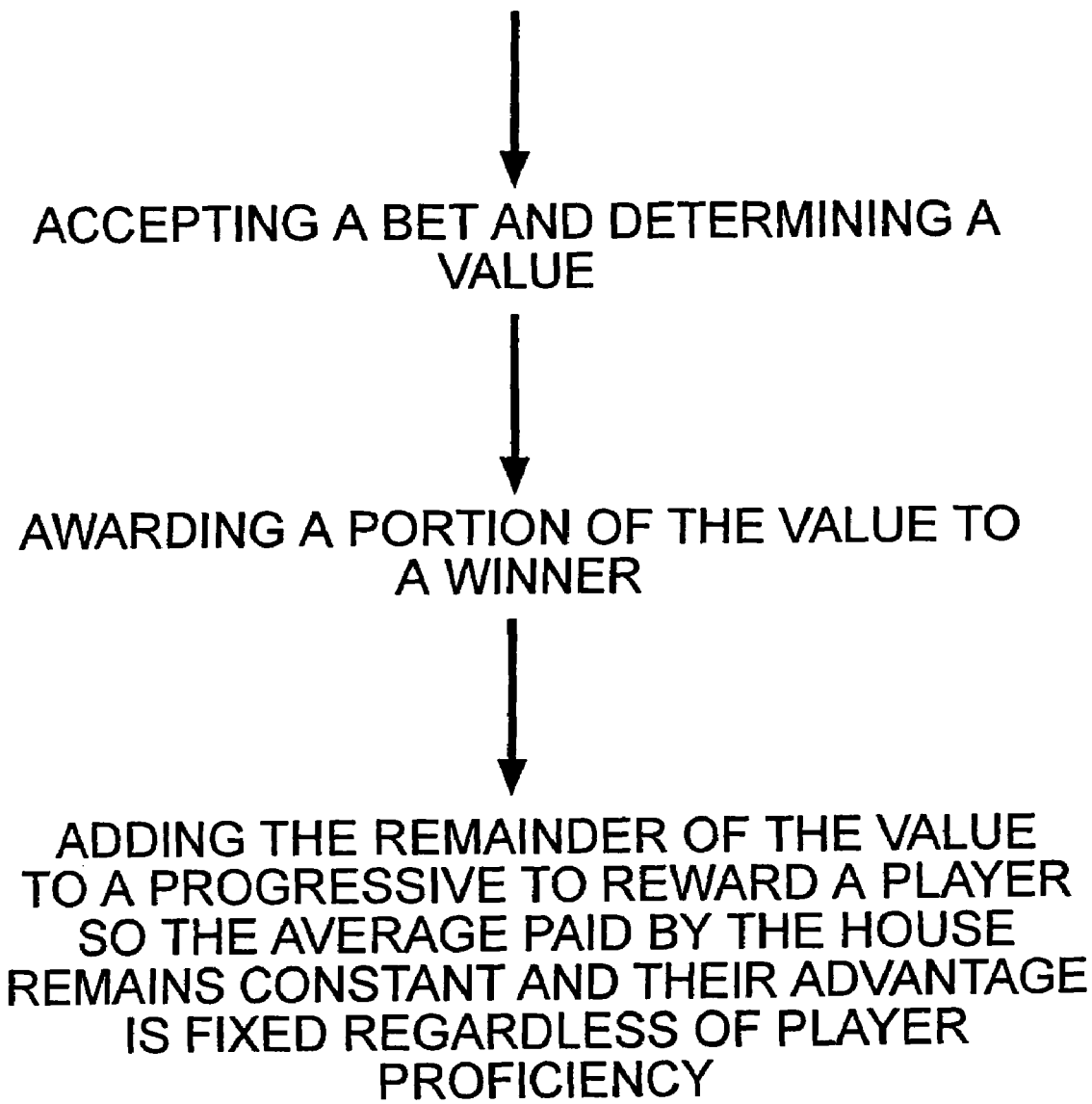
FIG. 2 is a flow diagram of a method of house apportionment disclosed for a casino game of the present invention.
Figure 3:
FIG. 3 is a flow diagram of a method of house apportionment of a value disclosed for a knowledge-based game of the present invention.
Figure 3:

A method of playing a casino game has the steps of accepting a wager and determining a value. FIG. 2 shows the flow diagram for the house apportionment for a casino game value. FIG. 3 shows a flow diagram of a method of house apportionment of a value disclosed for a knowledge-based game of the present invention. Then the step of awarding the player a portion of the value. The step of adding a remainder of the value to the at least one escrow account available to reward the player or subsequent players is followed. The average value paid by the house remains constant and the house advantage is fixed regardless of player proficiency in the game. The steps of awarding and adding happen while playing a knowledge-based game.

What is useful about the described approach is that, from a casino or house operator's point of view, every time the bonus round begins, a known average number of coins are awarded. The credits are awarded either to the player immediately, to the escrow account (to be dispensed later), or between the two. Some known average bonus round award, from the casino, house or operator's point of view, is distributed, either to the current player or a players' escrow account. As such, the house advantage for the slot machine and knowledge-based bonus game remains predetermined.

While the knowledge-based game for bonus, jackpot, progressive, or otherwise including the underlying game, has been described with variations and in connection with at least several particular embodiments, it should be understood that the details given are not meant to limit the teachings of the invention. In particular, the manner in which the knowledge-based game may be conducted may vary greatly. In the case of knowledge-based questions, the manner in which they are asked can also be varied greatly. The manner in which a player may win the escrow amount may also be by design choice, as is the fractional division of the award round between immediately awarded to the player and that saved to escrow to be awarded later. The approach applies to all casino games, and is especially well suited to games wherein the player may have a high level of knowledge or skill. In the claims, the concept includes apportionment of the value via a remainder-funded escrow or variants thereof.

What is claimed is:

1. A method of playing a wagering game in response to a wager comprising the steps of:
   providing an escrow value in an escrow account of the wagering game,
   presenting to a player during play of the wagering game a question with a plurality of answers, at least one of the plurality of answers an incorrect answer, the remaining answers being correct answers, each correct answer having a corresponding payout value,
   selecting by the player in the wagering game one of the plurality of answers,
   awarding the player the corresponding payout value when the selected one answer is a correct answer and then returning to play of the wagering game in the aforesaid step of selecting,
   ending play of the wagering game when the selected one answer is an incorrect answer and adding the values of the payouts for the remaining correct answers, presented but not selected by the player, to the escrow value,
   awarding the player the escrow value from the escrow account only when the player selects all of the correct answers in the plurality of answers and then ending play of the wagering game.

2. The method of claim 1 wherein the step of presenting further comprises:
   providing at least one correct answer with a corresponding payout value different in value from the remaining corresponding values.

3. The method of claim 1 further comprising:
   setting the escrow value in the escrow account to zero in response to awarding the escrow value.

4. The method of claim 1 further comprising:
   setting the escrow value in the escrow account to an initial value in response to awarding the escrow value.

5. The method of claim 1 wherein the step of presenting further comprises:
   presenting the question to the player in a touch screen and wherein the step of selecting further comprises the player touching the touch screen to select said one of the plurality of answers.

6. The method of claim 1 wherein the step of selecting further comprises:
   receiving an input from a keyboard when the player selects said one of the plurality of answers.

7. The method of claim 1 wherein the step of selecting further comprises:
   receiving an input from a voice recognition mechanism when the player selects said one of the plurality of answers.

8. The method of claim 1 further comprising the step of:
   providing a time limit for the player to select said one of the plurality of answers in response to the presenting step,
   when the time limit expires, treating the step of selecting as selecting an incorrect answer.

9. The method of claim 1 wherein the step of awarding the player with a corresponding payout value further comprises:
   awarding a higher corresponding payout value the quicker in time the player selects said one of the plurality of answers.

10. The method of claim 1 wherein the step of awarding the player with a corresponding payout value further comprises:
    awarding a lower corresponding payout value the longer in time the player selects said one of the plurality of answers.

11. The method of claim 1 further comprising:
    providing a clue to the player as to which of the plurality of answers is a correct answer in response to the step of presenting.

12. The method claim of claim 11 wherein the clue is provided to the player as a function of time after the step of presenting.

13. The method claim of claim 11 wherein the clue may be bought by the player.

14. The method claim of claim 13 wherein the player buys the clue for an additional wager.

15. The method claim of claim 13 wherein the player buys the clue by accepting a reduced corresponding payout award when the answer selected is correct.

* * * * *